United States Patent
Taylor et al.

(10) Patent No.: US 12,332,858 B1
(45) Date of Patent: Jun. 17, 2025

(54) SYSTEMS AND METHODS FOR INTEGRATED ANALYSIS OF FOREGROUND AND BACKGROUND COMMUNICATION DATA

(71) Applicant: BANK OF AMERICA CORPORATION, Charlotte, NC (US)

(72) Inventors: Jo-Ann Taylor, Godalming (GB); Kyle Mayers, Charlotte, NC (US); Kathleen Rae Hablutzel, Pittsboro, NC (US); Olga Kocharyan, Matthews, NC (US); Jinna Kim, Charlotte, NC (US); Anna Berry, Indian Land, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/731,906

(22) Filed: Jun. 3, 2024

(51) Int. Cl.
G06F 16/00 (2019.01)
G06F 16/215 (2019.01)
G06F 16/26 (2019.01)

(52) U.S. Cl.
CPC ............ *G06F 16/215* (2019.01); *G06F 16/26* (2019.01)

(58) Field of Classification Search
CPC .............................. G06F 16/215; G06F 16/26
See application file for complete search history.

(56) References Cited

U.S. PATENT DOCUMENTS

| | | | | |
|---|---|---|---|---|
| 9,515,891 B2 * | 12/2016 | Ickman | .................. | G06F 3/0482 |
| 10,999,434 B1 * | 5/2021 | Andar | ...................... | G06N 5/04 |
| 12,013,838 B2 * | 6/2024 | Nigam | ............... | G06Q 10/0631 |
| 12,045,269 B2 * | 7/2024 | Cook | .................. | G06F 16/3329 |
| 12,210,858 B1 * | 1/2025 | Silver | ........................ | G06F 8/60 |
| 2018/0349335 A1 * | 12/2018 | Hodge | .................... | G10L 15/26 |
| 2018/0349446 A1 * | 12/2018 | Triolo | ................... | G06F 16/252 |
| 2018/0349793 A1 * | 12/2018 | Triolo | .................... | G06N 5/048 |
| 2020/0210490 A1 * | 7/2020 | Hutchins | ............. | G06V 30/412 |
| 2020/0349938 A1 * | 11/2020 | Hwang | ..................... | G06F 3/16 |
| 2021/0073216 A1 * | 3/2021 | Chang | .............. | G06F 16/24573 |
| 2022/0109838 A1 * | 4/2022 | Guruva reddiar | ... | H04N 19/119 |
| 2022/0277642 A1 * | 9/2022 | Fukushima | ...... | G08B 13/19682 |
| 2023/0004785 A1 * | 1/2023 | Uehara | .................. | G06N 3/098 |

(Continued)

*Primary Examiner* — Noosha Arjomandi
(74) *Attorney, Agent, or Firm* — Moore & Van Allen PLLC; Nicholas C. Russell

(57) ABSTRACT

Systems, and methods are described herein for integrated analysis of foreground and background communication data. The present disclosure is configured to collect foreground communication data from one or more data sources; collect background communication data from one or more data sources; pre-process the collected data to clean, normalize, and transform it into a uniform format; integrate the pre-processed data into a cohesive dataset via data alignment based on common identifiers such as timestamps or session IDs; analyze the integrated dataset using an artificial intelligence (AI) engine employing machine learning algorithms to identify patterns and generate responses based on the cohesive dataset; generate an initial AI response based on the analysis; present the AI-generated response and alternative solutions to a user through an interactive user interface; capture user feedback on the presented responses and alternative solutions; and retrain the AI engine based on the captured user feedback to improve future decision-making.

20 Claims, 5 Drawing Sheets

(56) References Cited

U.S. PATENT DOCUMENTS

| | | | | |
|---|---|---|---|---|
| 2023/0154487 | A1* | 5/2023 | Huang | G10L 25/63 |
| | | | | 704/243 |
| 2023/0385537 | A1* | 11/2023 | Yannam | G06N 3/09 |
| 2024/0004891 | A1* | 1/2024 | Basu | G06F 3/0482 |
| 2024/0050003 | A1* | 2/2024 | Day | A61B 5/7267 |
| 2024/0220324 | A1* | 7/2024 | Talavera | G06Q 10/10 |
| 2024/0255497 | A1* | 8/2024 | Alsheimer | G01N 33/5302 |
| 2024/0264988 | A1* | 8/2024 | MacNeill | G06F 16/215 |
| 2024/0273793 | A1* | 8/2024 | DeCharms | G09B 5/06 |
| 2024/0281472 | A1* | 8/2024 | LaRhette | G06F 16/248 |
| 2024/0324838 | A1* | 10/2024 | Ebrahimi Afrouzi | |
| | | | | A47L 9/2857 |
| 2024/0330314 | A1* | 10/2024 | Tejvir | G06F 16/215 |
| 2024/0330444 | A1* | 10/2024 | Soryal | G06F 21/554 |
| 2024/0361742 | A1* | 10/2024 | Gaus | G05B 19/05 |
| 2024/0428003 | A1* | 12/2024 | Kakodkar | G06F 40/30 |
| 2025/0021789 | A1* | 1/2025 | Bennett | G06N 3/004 |

* cited by examiner

SYSTEMS AND METHODS FOR INTEGRATED ANALYSIS OF FOREGROUND AND BACKGROUND COMMUNICATION DATA

TECHNOLOGICAL FIELD

Example embodiments of the present disclosure relate to integrated analysis of foreground and background communication data.

BACKGROUND

Artificial intelligence (AI) systems are increasingly used to make decisions based on various types of input data. While these AI engines often perform well with structured, straightforward data, they frequently fail to match human decision-making capabilities, particularly when background data, such as tone, speed of speaking, and other contextual cues, is not considered. For example, an AI analyzing a phone call might focus solely on the transcribed text, neglecting the speaker's tone or speed of speech, leading to incorrect or suboptimal decisions.

Applicant has identified a number of deficiencies and problems associated with integrated analysis of foreground and background communication data. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for integrated analysis of foreground and background communication data. The present invention addresses the shortcomings of existing AI systems by providing a system that integrates the analysis of both foreground communication data (e.g., text from a phone call, or the like) and background data (e.g., voice data, tonal data, pitch data, and visual data from a user interface, or the like). This integrated analysis allows the AI engine to generate outputs that are tempered or modified based on the background data, leading to more accurate and contextually appropriate decisions.

In some embodiments, the invention includes a bi-directional feedback loop that serves two purposes: (1) it allows human users to interact with the AI system and consider alternative solutions not initially presented, thereby providing perspective on the AI's decision; and (2) it enables the AI system to retrain itself based on user feedback, improving future decision-making. The system may utilize a plurality of AI engines to generate multiple potential solutions from the same data set. The feedback from the user can then guide the selection of the most appropriate AI engine and its output for future use.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
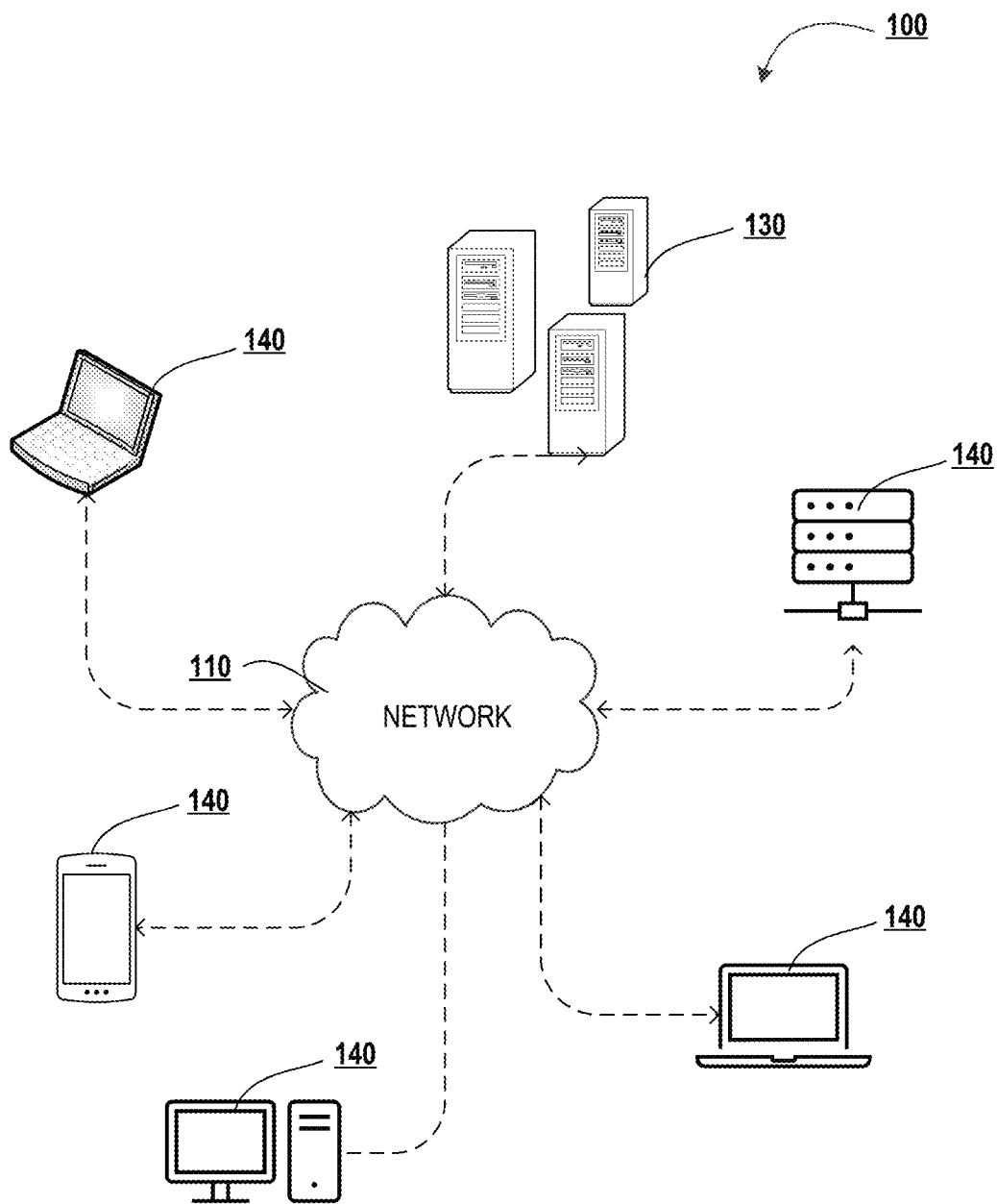
Figure 1B:
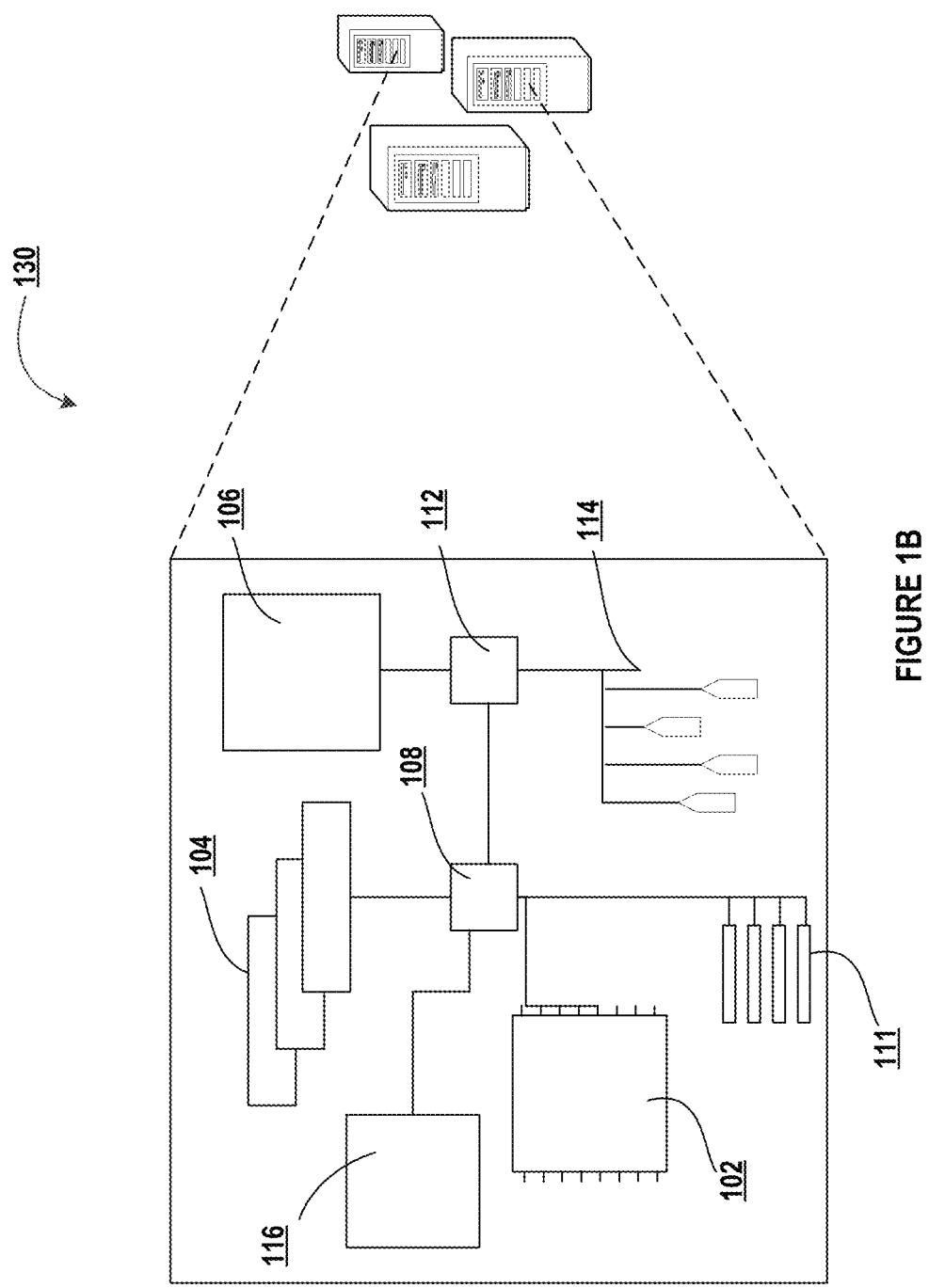
Figure 1C:
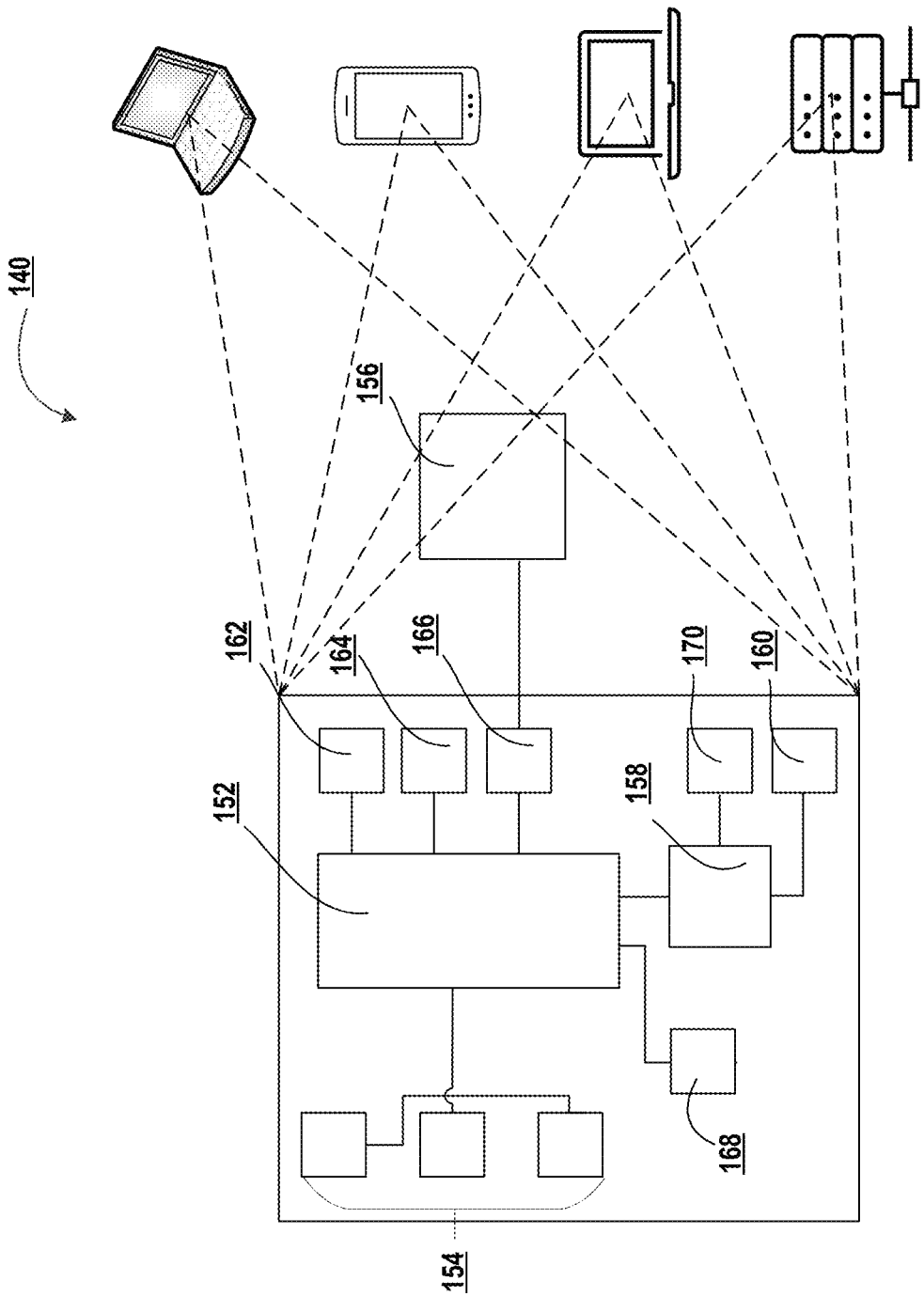
Figure 2:
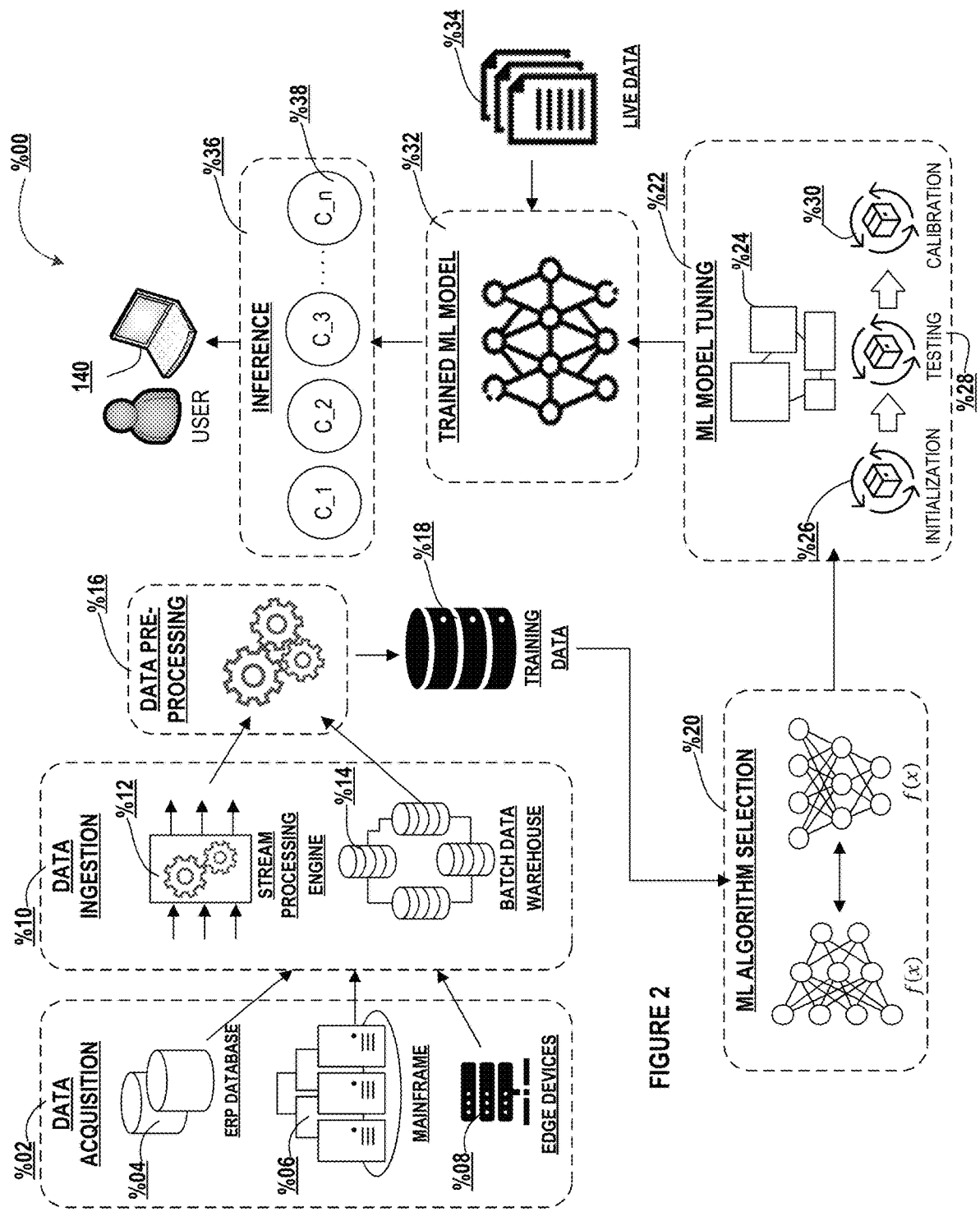
Figure 3:
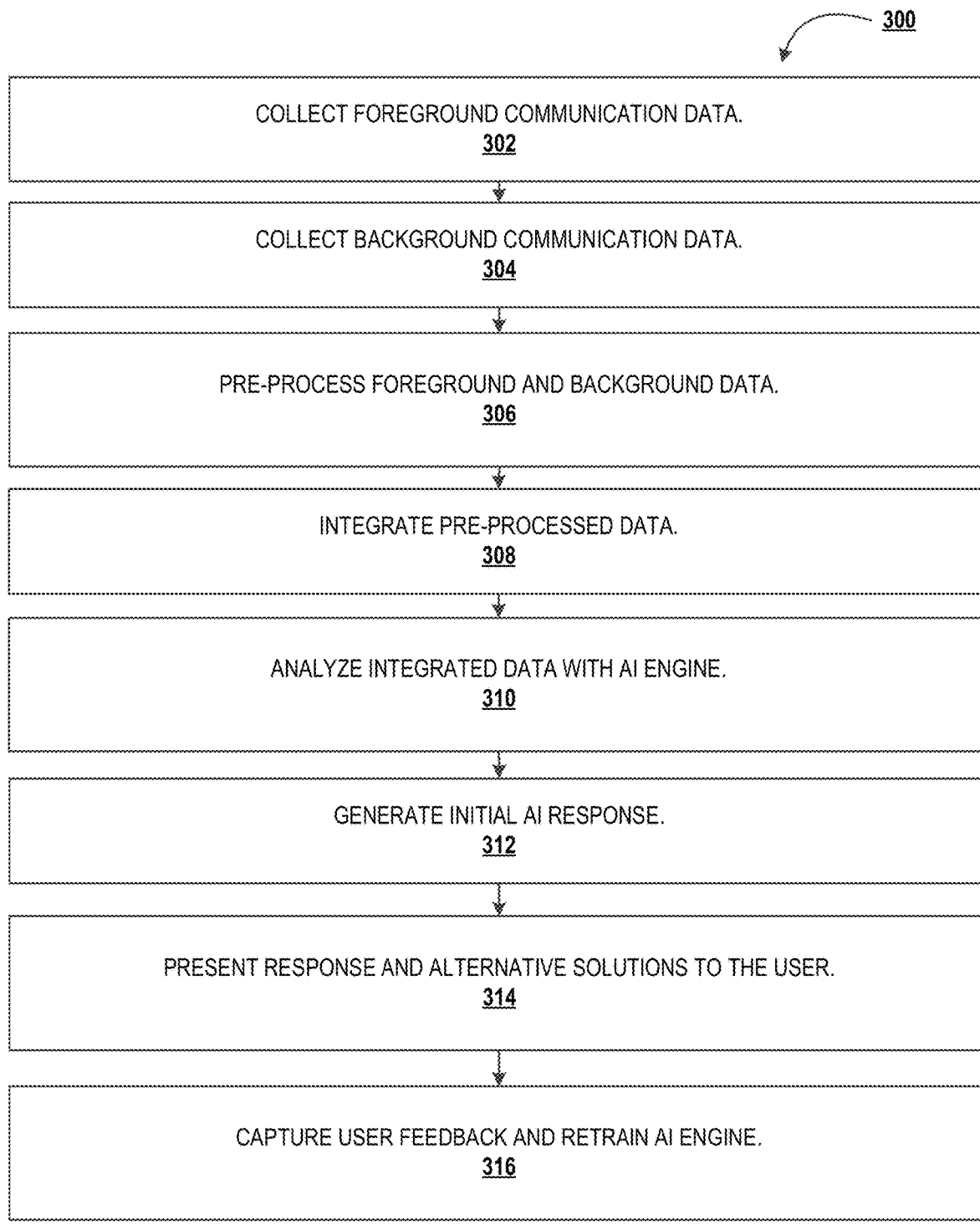

FIGS. 1A-1C illustrates technical components of an exemplary distributed computing environment for integrated analysis of foreground and background communication data, in accordance with an embodiment of the disclosure;

FIG. 2 illustrates an exemplary machine learning (ML) subsystem architecture 200, in accordance with an embodiment of the invention; and FIG. 3 illustrates a process flow for integrated analysis of foreground and background communication data, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, an "AI Engine" may refer to a software system that utilizes algorithms to process input data and generate decisions or responses based on that data. An AI engine may include components for data collection, data processing, and decision output generation. The AI engine can be implemented using various machine learning models, neural networks, or other AI techniques. In some embodiments, an AI engine may operate independently or in conjunction with other AI engines to enhance decision-making capabilities.

As used herein, "Foreground Communication Data" may refer to data directly related to the content of a communication, such as text transcriptions from phone calls, emails, messages, or other forms of digital communication. This data represents the primary information exchanged during the communication. Unless specifically limited by the context, foreground communication data may also include metadata associated with the communication content.

As used herein, "Background Data" may refer to contextual information accompanying the primary communication data. Background data may include, but is not limited to, voice characteristics (such as tone, pitch, and speed of speaking), visual data from user interfaces, environmental sounds, and other non-verbal cues. This data provides additional context that can influence the interpretation and response to the primary communication data.

As used herein, a "Bi-Directional Feedback Loop" may refer to a system mechanism that allows for mutual feedback between the human user and the AI engine. The feedback loop facilitates continuous improvement of the AI engine's responses based on user input. In some embodiments, the feedback loop may involve presenting alternative solutions to the user and incorporating the user's evaluations into the AI engine's training process.

As used herein, an "Interactive User Interface" may refer to a graphical interface on a user's device that enables interaction between the user and the AI system. This interface may include elements such as icons, buttons, menus, and prompts that allow the user to provide feedback, make selections, and interact with the AI engine. In some embodiments, the interactive user interface may also display alternative solutions generated by the AI engine.

As used herein, a "Tempered Response" may refer to an AI-generated output that has been adjusted or modified based on the analysis of background data to ensure it is contextually appropriate. A tempered response takes into account factors such as the user's emotional state, tone of voice, and other contextual cues to provide a more suitable and effective response.

As used herein, "Communication Data" may collectively refer to both foreground communication data and background data. Communication data encompasses all information exchanged during a communication, including the primary content and contextual information that influences the interpretation of that content.

As used herein, a "User Device" may refer to any electronic device used by a human user to interact with the AI system. User devices may include, but are not limited to, smartphones, tablets, computers, smartwatches, and other internet-connected devices capable of displaying an interactive user interface and processing communication data.

As used herein, "Training Data" may refer to data used to train the AI engine to improve its decision-making capabilities. Training data may include historical communication data, user feedback, simulated scenarios, and other relevant data sets that help the AI engine learn and adapt over time. In some embodiments, training data is continuously updated to reflect new information and feedback.

As used herein, "Potential Solutions" may refer to different responses or actions generated by the AI engine(s) as possible outcomes to address a user's query or problem. Potential solutions may be presented to the user for feedback and evaluation, and the AI engine may use this feedback to select the most appropriate solution.

As used herein, a "Graphical User Interface (GUI)" may refer to a visual interface that allows users to interact with electronic devices through graphical elements like icons, buttons, menus, and windows. The GUI facilitates user interaction with the AI system and the provision of feedback on AI-generated solutions.

As used herein, "Retraining" may refer to the process by which an AI engine updates its algorithms and decision-making processes based on new data or feedback. Retraining allows the AI engine to improve its accuracy and effectiveness in generating responses over time. In some embodiments, retraining occurs continuously as new feedback and data are received.

As used herein, "Visual Data" may refer to data captured from the graphical user interface or other visual inputs that provide additional context for the AI system. Visual data may include screen captures, user interface layouts, and other visual elements that influence the interpretation of communication data.

As used herein, "Processing Resources" may refer to computational resources required to execute the AI algorithms, including CPU, memory, storage, and other hardware and software components necessary for data processing and decision generation.

As used herein, "Network Resources" may refer to communication infrastructure required to transmit data between user devices and the AI system, including bandwidth, connectivity, and other network-related components that facilitate data exchange.

As used herein, "Solution Generation" may refer to the process by which the AI engine creates possible responses or actions to address a user's query. Solution generation involves analyzing communication data, considering contextual information, and producing outputs that aim to resolve the user's issue.

As used herein, "User Feedback" may refer to information provided by the user regarding the effectiveness or relevance of the AI-generated solutions. User feedback is used to improve the AI engine's future responses and to retrain the AI system.

As used herein, "Contextual Data" may refer to information that provides context to the primary communication data, including environmental factors, user-specific attributes, and other relevant data that influence the interpretation and response to communication.

As used herein, "Optimal Resource Utilization" may refer to the efficient use of computational and network resources to achieve desired outcomes with minimal waste. Optimal resource utilization involves balancing the use of resources to ensure high performance and efficiency.

As used herein, an "AI Model" may refer to a mathematical model used by the AI engine to process input data and generate outputs. AI models may include machine learning models, neural networks, and other algorithmic structures that enable the AI engine to analyze data and make decisions.

As used herein, "Communication Analysis" may refer to the examination of both foreground and background communication data to derive meaningful insights and responses. Communication analysis involves processing and interpreting data to understand the context and content of communications.

As used herein, "Alternative Solutions" may refer to additional potential responses generated by the AI system for consideration, beyond the initial solution provided. Alternative solutions offer different approaches to resolving a user's query or problem, allowing for a broader range of options.

As used herein, "Human-Machine Interaction" may refer to the interaction between a human user and the AI system, encompassing both input from the user and responses from the AI. Human-machine interaction involves communication, feedback, and adaptation to improve the effectiveness of the AI system.

The present invention relates to advanced artificial intelligence (AI) systems designed for comprehensive communication analysis. This innovative technology integrates the assessment of both foreground communication data (e.g., textual data, or the like) and background communication data (e.g., tonal and pitch data, or the like) to enhance the decision-making capabilities of AI engines.

Traditional AI systems often struggle with decision-making when they fail to account for contextual background data. These systems typically analyze communication data at face value, neglecting important cues such as tone, speed of speaking, and other contextual elements. This oversight can lead to incorrect or suboptimal decisions that do not align with human judgment.

The invention provides an AI system that not only analyzes the direct content of communications but also considers the context in which these communications occur. By integrating background data such as voice tone and pitch, the AI can better understand and respond to the user's needs. Additionally, the system includes a feedback loop that helps the AI learn from user interactions and continuously improve its responses.

Accordingly, the present disclosure provides a comprehensive AI system that integrates both foreground and background data analysis to enhance decision-making processes.

It includes a bi-directional feedback loop that allows users to provide feedback on the AI's decisions, which in turn helps the AI retrain and improve over time. Multiple AI engines can generate potential solutions, and user feedback can guide the selection of the most appropriate response, ensuring more accurate and contextually relevant outputs.

What is more, the present disclosure provides a technical solution to a technical problem. As described herein, the technical problem includes the inability of traditional AI systems to accurately interpret and respond to communication data without considering contextual background information. The technical solution presented herein allows for the integration of both foreground and background data in the AI's analysis process, leading to more accurate and contextually appropriate decisions. In particular, the integrated analysis of foreground and background data is an improvement over existing solutions to the problem, with fewer steps to achieve the solution, thus reducing the amount of computing resources, such as processing resources, storage resources, network resources, and/or the like, that are being used. Additionally, this solution provides a more accurate response, reducing the need for resources to correct errors from less accurate solutions. It also eliminates manual input and waste, improving the speed and efficiency of the process and conserving computing resources. Moreover, it determines the optimal amount of resources needed for implementation, thereby reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for integrated analysis of foreground and background communication data, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention for integrated analysis of foreground and background communication data. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing to support the integrated analysis of both foreground and background communication data in the AI system.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data streams (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering to support the AI system's need for comprehensive data analysis.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed to enable effective analysis of both foreground and background data in the AI system.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points. The enriched data enhances the AI system's ability to integrate and analyze both foreground and background communication data.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making predictions about a dataset to improve the AI system's integrated analysis capabilities.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like to enhance the AI system's ability to effectively integrate and analyze both foreground and background communication data.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized to ensure precise integration and analysis of both foreground and background communication data in the AI system.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ . . . . $C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ . . . . $C\_n$ 238) live data 234 based on how similar they are to one another to solve exploratory challenges where little is known about the data, provide a description or label (e.g., $C\_1$, $C\_2$ . . . . $C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes to enhance the AI system's integrated analysis and decision-making capabilities for foreground and background communication data.

It will be understood that the embodiment of the machine learning subsystem 200 illustrated in FIG. 2 is exemplary and that other embodiments may vary. As another example, in some embodiments, the machine learning subsystem 200 may include more, fewer, or different components to further support the invention's aim of integrating and analyzing both foreground and background communication data.

FIG. 3 illustrates a process flow 300 for integrated analysis of foreground and background communication data, in accordance with an embodiment of the disclosure. As shown in block 302, the process begins with the collection of foreground communication data. This involves utilizing a data acquisition engine to identify and gather textual information from various sources, such as transcriptions of phone calls, emails, or messages. The data acquisition engine is configured to interface with multiple data sources, including databases, real-time streams, and file storage systems. For example, it might connect to an RDBMS to pull email data, use an API to collect chat logs from messaging applications, or tap into streaming services to access real-time call transcriptions. The engine utilizes network protocols like FTP, HTTP, and API calls to fetch data. The collected foreground communication data is then temporarily stored in a staging area for initial processing.

As shown in block 304, background communication data is collected simultaneously with the foreground data. This involves gathering contextual information such as voice tone, pitch, speed of speaking, and visual data from user interfaces. The data acquisition engine employs additional modules to capture this background data. For example, it might use voice recognition software to analyze tone and pitch from audio files, or interface with edge devices like sensors and cameras to gather visual data. The collected background data is synchronized with the corresponding foreground data using timestamps or unique identifiers to ensure accurate pairing. This synchronized data is then moved to a pre-processing queue.

As shown in block 306, both foreground and background data undergo pre-processing to prepare them for integration. The pre-processing engine includes several sub-modules designed for data cleaning, normalization, and transformation. For foreground data, this might involve tokenization of text, removal of stop words, and normalization of text cases. For background data, it could involve noise reduction in audio files, normalization of pitch and tone values, and standardization of visual data formats. Techniques such as filling missing values, smoothing noisy data, resolving inconsistencies, and removing outliers are applied. The pre-processed data is then structured into a uniform format suitable for integration, typically stored in a data warehouse or a NoSQL database for high-throughput access.

As shown in block 308, the pre-processed foreground and background data are integrated into a cohesive dataset. This integration process involves aligning the data based on common identifiers, such as timestamps or session IDs. The integration engine performs operations like joining tables from a relational database, merging data streams, and aggregating relevant data points. For instance, a phone call transcript (foreground data) might be combined with corresponding tonal analysis and user interface interaction logs (background data). The integrated dataset is enriched with metadata to maintain the relationship between different data points. This dataset is stored in a format that supports efficient querying and analysis, such as a multi-dimensional OLAP cube or a graph database.

As shown in block 310, the integrated data is analyzed using the AI engine. The AI engine employs various machine learning algorithms, such as supervised learning for classification tasks and unsupervised learning for pattern recognition. The analysis process involves feeding the integrated dataset into the AI model, which is pre-trained on similar types of data. The model utilizes feature extraction techniques to identify key attributes from both foreground and background data. For example, text features might include n-grams and sentiment scores, while audio features could include tone, pitch, and speech rate. The AI engine processes this data through its neural network layers or decision trees, applying complex mathematical computations to derive insights. The output is a set of predictions or decisions that reflect a comprehensive understanding of the communication data.

As shown in block 312, the AI engine generates an initial response based on its analysis. This response is formulated by interpreting the integrated data and applying decision rules encoded within the AI model. The response generation module considers various factors, such as the user's emotional state inferred from background data and the content context derived from foreground data. For instance, if the user's tone indicates frustration, the AI might generate a response that is calm and reassuring. The initial response is encoded in a structured format, such as JSON or XML, and includes confidence scores and alternative suggestions. This response is then passed to the presentation layer for user interaction.

As shown in block 314, the AI-generated response, along with alternative solutions, is presented to the user through an interactive user interface. The user interface is designed to be intuitive and user-friendly, displaying the AI's decision and other potential solutions side by side. The presentation layer leverages web technologies like HTML, CSS, and JavaScript for front-end development, ensuring a responsive and dynamic experience. Users can select different options, view detailed explanations, and provide feedback. The system captures user interactions, such as clicks, selections, and comments, which are logged and stored for further analysis. This step is crucial for obtaining real-world feedback on the AI's performance.

As shown in block 316, user feedback is captured and used to retrain the AI engine. The feedback loop involves collecting data on user interactions with the presented solutions, including which solution was chosen and any additional feedback provided. This data is processed and analyzed to identify patterns and areas for improvement. The retraining process involves updating the training dataset with the new feedback data, re-running feature extraction, and fine-tuning the AI model's parameters. Advanced techniques such as reinforcement learning may be applied, where the AI engine adjusts its decision-making strategies based on the rewards or consequences inferred from user feedback. This continuous learning process ensures that the AI engine evolves and improves its accuracy and effectiveness over time. The retrained model is then redeployed into the production environment for ongoing use.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for integrated analysis of foreground and background communication data, the system comprising:
   a processing device;
   a non-transitory storage device containing instructions when executed by the processing device, causes the processing device to perform the steps of:
      collecting foreground communication data from one or more data sources;
      collecting background communication data from the one or more data sources;
      pre-processing the foreground communication data and the background communication data to clean, normalize, and transform the foreground communication data and the background communication data into a uniform format, including filling in missing values, smoothing noise, resolving inconsistencies, and removing outliers;
      integrating the pre-processed data into a cohesive dataset via data alignment based on common identifiers such as timestamps or session IDs, and storing the cohesive dataset;
      analyzing the cohesive dataset using an artificial intelligence (AI) engine employing machine learning algorithms to identify patterns and generate responses based on the cohesive dataset;
      generating an initial AI response based on the analysis of the cohesive dataset;
      presenting the initial AI response and alternative solutions to a user through an interactive user interface that allows user interaction and feedback;
      capturing user feedback on the initial AI response and the alternative solutions; and
      retraining the AI engine based on the captured user feedback to improve future decision-making by updating a training dataset, re-running feature extraction, and fine-tuning an AI model's parameters.

2. The system of claim 1, wherein the system is further configured to: identify and interface with various internal and external data sources using network protocols comprising File Transfer Protocol (FTP), Hyper-Text Transfer Protocol (HTTP), and Application Programming Interfaces (APIs) to collect the foreground communication data and the background communication data.

3. The system of claim 2, wherein the background communication data includes:
   voice characteristics such as tone, pitch, and speed of speaking; and
   visual data captured from user interfaces or edge devices such as cameras and sensors.

4. The system of claim 1, wherein pre-processing the foreground communication data and the background communication data further comprises:
   performing data transformation techniques including tokenization of text, removal of stop words, normalization of text cases for foreground data, and noise reduction, normalization of pitch and tone values, and standardization of visual data formats for background data.

5. The system of claim 1, wherein the AI engine employs machine learning algorithms including:
   supervised learning for classification tasks;
   unsupervised learning for pattern recognition; and
   reinforcement learning to continuously improve decision-making based on feedback.

6. The system of claim 1, wherein presenting the initial AI response and alternative solutions further comprises:
   displaying the AI-generated response and alternative solutions via the user interface that allows the user to interact with and evaluate the provided options, capturing user selections and additional feedback via graphical elements comprising buttons, menus, and interactive prompts.

7. The system of claim 1, wherein retraining the AI engine further comprises:
   updating the training dataset with captured user feedback, re-running feature extraction, and fine-tuning the AI model's parameters using techniques such as reinforcement learning to enhance accuracy and effectiveness of the AI engine's future responses.

8. A computer program product for integrated analysis of foreground and background communication data, the computer program product comprising a non-transitory computer-readable medium comprising code causing an apparatus to:
   collect foreground communication data from one or more data sources;
   collect background communication data from the one or more data sources;
   pre-process the foreground communication data and the background communication data to clean, normalize, and transform the foreground communication data and the background communication data into a uniform format, including filling in missing values, smoothing noise, resolving inconsistencies, and removing outliers;
   integrate the pre-processed data into a cohesive dataset via data alignment based on common identifiers such as timestamps or session IDs, and storing the cohesive dataset;
   analyze the cohesive dataset using an artificial intelligence (AI) engine employing machine learning algorithms to identify patterns and generate responses based on the cohesive dataset;
   generate an initial AI response based on the analysis of the cohesive dataset;
   present the initial AI response and alternative solutions to a user through an interactive user interface that allows user interaction and feedback;
   capture user feedback on the initial AI response and the alternative solutions; and
   retrain the AI engine based on the captured user feedback to improve future decision-making by updating a training dataset, re-running feature extraction, and fine-tuning an AI model's parameters.

9. The computer program product of claim 8, wherein the code further causes the apparatus to: identify and interface with various internal and external data sources using network protocols comprising File Transfer Protocol (FTP), Hyper-Text Transfer Protocol (HTTP), and Application Programming Interfaces (APIs) to collect the foreground communication data and the background communication data.

10. The computer program product of claim 9, wherein the background communication data includes:
- voice characteristics such as tone, pitch, and speed of speaking; and
- visual data captured from user interfaces or edge devices such as cameras and sensors.

11. The computer program product of claim 8, wherein pre-processing the foreground communication data and the background communication data further comprises:
- performing data transformation techniques including tokenization of text, removal of stop words, normalization of text cases for foreground data, and noise reduction, normalization of pitch and tone values, and standardization of visual data formats for background data.

12. The computer program product of claim 8, wherein the AI engine employs machine learning algorithms including:
- supervised learning for classification tasks;
- unsupervised learning for pattern recognition; and
- reinforcement learning to continuously improve decision-making based on feedback.

13. The computer program product of claim 8, wherein presenting the initial AI response and alternative solutions further comprises:
- displaying the AI-generated response and alternative solutions via the user interface that allows the user to interact with and evaluate the provided options, capturing user selections and additional feedback via graphical elements comprising buttons, menus, and interactive prompts.

14. The computer program product of claim 8, wherein retraining the AI engine further comprises:
- updating the training dataset with captured user feedback, re-running feature extraction, and fine-tuning the AI model's parameters using techniques such as reinforcement learning to enhance accuracy and effectiveness of the AI engine's future responses.

15. A method for integrated analysis of foreground and background communication data, the method comprising:
- collecting foreground communication data from one or more data sources;
- collecting background communication data from the one or more data sources;
- pre-processing the foreground communication data and the background communication data to clean, normalize, and transform the foreground communication data and the background communication data into a uniform format, including filling in missing values, smoothing noise, resolving inconsistencies, and removing outliers;
- integrating the pre-processed data into a cohesive dataset via data alignment based on common identifiers such as timestamps or session IDs, and storing the cohesive dataset;
- analyzing the cohesive dataset using an artificial intelligence (AI) engine employing machine learning algorithms to identify patterns and generate responses based on the cohesive dataset;
- generating an initial AI response based on the analysis of the cohesive dataset;
- presenting the initial AI response and alternative solutions to a user through an interactive user interface that allows user interaction and feedback;
- capturing user feedback on the initial AI response and the alternative solutions; and
- retraining the AI engine based on the captured user feedback to improve future decision-making by updating a training dataset, re-running feature extraction, and fine-tuning an AI model's parameters.

16. The method of claim 15, wherein the method further comprises: identify and interface with various internal and external data sources using network protocols comprising File Transfer Protocol (FTP), Hyper-Text Transfer Protocol (HTTP), and Application Programming Interfaces (APIs) to collect the foreground communication data and the background communication data.

17. The method of claim 16, wherein the background communication data includes:
- voice characteristics such as tone, pitch, and speed of speaking; and
- visual data captured from user interfaces or edge devices such as cameras and sensors.

18. The method of claim 15, wherein pre-processing the foreground communication data and the background communication data further comprises:
- performing data transformation techniques including tokenization of text, removal of stop words, normalization of text cases for foreground data, and noise reduction, normalization of pitch and tone values, and standardization of visual data formats for background data.

19. The method of claim 15, wherein the AI engine employs machine learning algorithms including:
- supervised learning for classification tasks;
- unsupervised learning for pattern recognition; and
- reinforcement learning to continuously improve decision-making based on feedback.

20. The method of claim 15, wherein presenting the initial AI response and alternative solutions further comprises:
- displaying the AI-generated response and alternative solutions via the user interface that allows the user to interact with and evaluate the provided options, capturing user selections and additional feedback via graphical elements comprising buttons, menus, and interactive prompts.

* * * * *